US012583214B2

(12) United States Patent (10) Patent No.: US 12,583,214 B2
Tomoyose et al. (45) Date of Patent: Mar. 24, 2026

(54) STICKING DEVICE

(71) Applicant: BEAC CO., LTD., Nagano (JP)

(72) Inventors: Taito Tomoyose, Nagano (JP);
Kazuhiko Kato, Nagano (JP)

(73) Assignee: BEAC CO., LTD., Nagano (JP)

( * ) Notice: Subject to any disclaimer, the term of this
patent is extended or adjusted under 35
U.S.C. 154(b) by 691 days.

(21) Appl. No.: 18/049,605

(22) Filed: Oct. 25, 2022

(65) Prior Publication Data

US 2023/0130039 A1 Apr. 27, 2023

(30) Foreign Application Priority Data

Oct. 26, 2021 (JP) ................................. 2021-174864

(51) Int. Cl.
B32B 41/00 (2006.01)
B32B 37/00 (2006.01)
B32B 38/18 (2006.01)

(52) U.S. Cl.
CPC .......... B32B 41/00 (2013.01); B32B 37/0053
(2013.01); B32B 37/025 (2013.01); **B32B
38/1833** (2013.01); *B32B 2309/06* (2013.01);
*B32B 2309/10* (2013.01); *B32B 2309/72*
(2013.01)

(58) Field of Classification Search
None
See application file for complete search history.

(56) References Cited

U.S. PATENT DOCUMENTS

| | | | | |
|---|---|---|---|---|
| 6,834,826 B2 * | 12/2004 | Nobuta | .............. | B65H 19/1863 |
| | | | | 242/555.3 |
| 7,195,410 B2 * | 3/2007 | Yoshida | ............. | G03G 21/1685 |
| | | | | 347/213 |
| 7,979,000 B2 * | 7/2011 | Sekina | ................. | G03G 21/168 |
| | | | | 399/121 |

FOREIGN PATENT DOCUMENTS

| | | |
|---|---|---|
| JP | 200688480 A | 4/2006 |
| JP | 2017-032739 A | 2/2017 |
| JP | 2020-131620 A | 8/2020 |

* cited by examiner

*Primary Examiner* — Michael N Orlando
*Assistant Examiner* — Abhishek A Patwardhan
(74) *Attorney, Agent, or Firm* — HAUPTMAN HAM,
LLP

(57) ABSTRACT

A sticking device includes: a transfer roller that transfers a
sticking film piece to a circumferential surface, and sticks
the sticking film piece to a member to be stuck; a moving
unit that moves the transfer roller; and a sticking film
adjusting unit that adjusts a position and a posture of the
sticking film piece on the circumferential surface of the
transfer roller at a position away from both a transfer region
A1 and a sticking region A2. The sticking film piece
adjusting unit includes: a rotation angle adjusting unit that
adjusts a sticking start position of the sticking film piece; a
width direction adjusting unit that adjusts a position of the
sticking film piece; and an inclination adjusting unit that
adjusts an angle of the transfer roller.

9 Claims, 13 Drawing Sheets

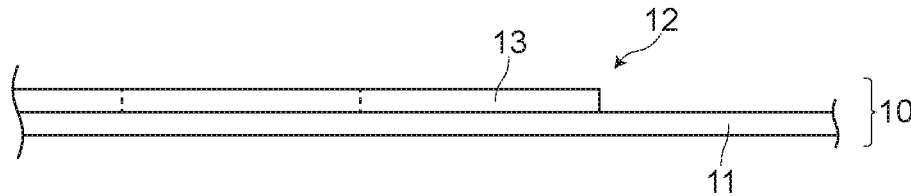
FIG.1A
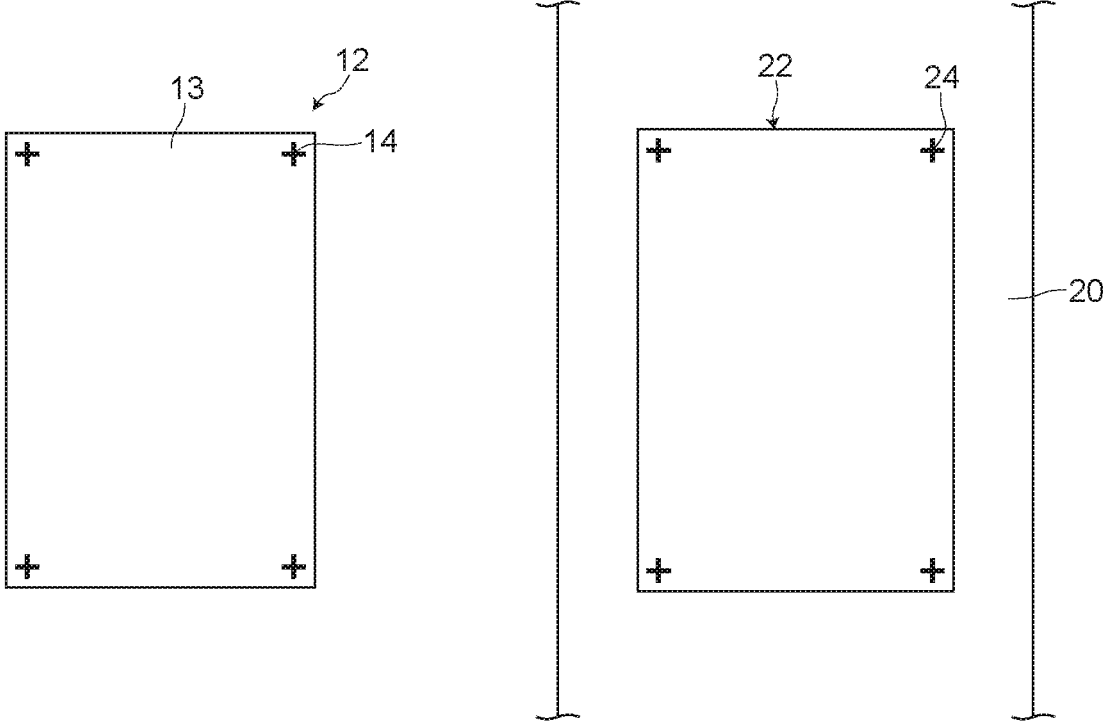
FIG.1B          FIG.1C

STICKING DEVICE

RELATED APPLICATIONS

The present application claims priority to Japanese Application Number 2021-174864, filed Oct. 26, 2021, the disclosure of which is hereby incorporated by reference herein in its entirety.

BACKGROUND OF THE INVENTION

Field of the Invention

The present invention relates to a sticking device.

Description of the Related Art

Conventionally, there has been known a sticking device where, after transferring a sticking film piece to a circumference surface of a transfer roller in a predetermined transfer region, the sticking film piece is stuck to a member to be stuck by the transfer roller in the predetermined sticking region.

FIG. 15 is a view illustrating the sticking device 900 described in Japanese patent laid-open publication 2006-088480 (patent literature 1). Symbol 10 indicates a lamination film, symbol 11 indicates a release film, symbol 922 indicates lamination film pay-off roller, and symbol 926 indicates a film winding roller. Patent literature 1 discloses the sticking device 900 where a sticking film feed roller 924, a transfer roller 940 and a member-to-be-stuck feed roller 934 are arranged side by side. After transferring the sticking film piece to a circumferential surface of the transfer roller 940 in a predetermined transfer region A1 on the lamination film feed roller 924, the sticking film piece is stuck to a member 20 to be stacked by the transfer roller 940 in a predetermine sticking region A2 on the member-to-be-stuck feed roller 934. The transfer roller 940 is brought into contact with both the lamination film feed roller 924 and the member-to-be-stuck feed roller 934.

SUMMARY OF THE INVENTION

However, in the invention described in patent literature 1, the transfer roller 940 is brought into contact with both the lamination film feed roller 924 and the member-to-be-stuck feed roller 934. Accordingly, when the posture of the transfer roller 940 is adjusted, such adjustment influences the conveyance of the lamination film 10 and the conveyance of the member to be stuck 20. Accordingly, the posture of the transfer roller 940 cannot be adjusted thus giving rise to a drawback that it is difficult to stick the sticking film piece with high accuracy.

In view of the above, the present invention has been made to overcome such a drawback, and it is an object of the present invention to provide a sticking device capable of performing the sticking of a sticking film piece with high accuracy.

According to an aspect of the present invention, there is provided a sticking device where a sticking film piece is transferred to a circumferential surface of a transfer roller in a predetermined transfer region, and the sticking film piece is stuck to a member to be stuck by the transfer roller in a predetermined sticking region, the sticking device comprising: the transfer roller that transfers the sticking film piece to the circumferential surface of the transfer roller in the transfer region and sticks the sticking film piece to the member to be stuck in the sticking region; a moving unit that relatively moves the transfer roller to the transfer region when the sticking film piece is transferred to the circumferential surface of the transfer roller, relatively moves the transfer roller to a position away from both the transfer region and the sticking region in a stage at least either before or after the sticking film piece is transferred to the circumferential surface of the transfer roller, and relatively moves the transfer roller to the sticking region when the sticking film piece is stuck to the member to be stuck; and a sticking film piece adjusting unit that adjusts a position and a posture of the sticking film piece on the circumferential surface of the transfer roller such that the sticking film piece takes a position that corresponds to the position and the posture of the member to be stuck when the sticking film piece is stuck to the member to be stuck at the position away from both the transfer region and the sticking region, wherein the sticking film piece adjusting unit includes: a rotation angle adjusting unit that adjusts a sticking start position of the sticking film piece on the circumferential surface of the transfer roller; a width direction adjusting unit that adjusts a position of the sticking film piece in a width direction that corresponds to a position of the member to be stuck in a width direction; and an inclination adjusting unit that adjusts an angle of the transfer roller with respect to a sticking angle of the member to be stuck.

In this specification, "transfer" means an operation of moving the sticking film piece from the transfer region to the circumferential surface of the transfer roller by rotating the transfer roller in a state where the transfer roller is brought into contact with the sticking film piece that is positioned in the transfer region.

According to the sticking device of the present invention, the sticking device includes the sticking film piece adjusting unit that adjusts a position and a posture of the sticking film piece on the circumferential surface of the transfer roller such that the sticking film piece takes the position and the posture that corresponds to the position and the posture of the member to be stuck when the sticking film piece is stuck to the member to be stuck at the position away from both the transfer region and the sticking region. With such a configuration, even when the posture of the transfer roller is adjusted, the conveyance of the lamination film and the conveyance of the member to be stuck are not affected by such adjustment. Accordingly, the posture of the transfer roller can be adjusted and hence, sticking of the sticking film piece can be performed with high accuracy.

Further, according to the sticking device of the embodiment, the sticking film piece adjusting unit includes the rotation angle adjusting unit, the width direction adjusting unit and the inclination adjusting unit. Accordingly, it is possible to finely adjust the position and the posture of the sticking film piece on the circumferential surface of the transfer roller such that the sticking film piece takes the position corresponding to the position and the posture of the member to be stuck.

BRIEF DESCRIPTION OF THE DRAWINGS

FIG. 1A to FIG. 1C are views illustrating a lamination film 10, a sticking film piece 13, and a member to be stuck 20 according to an embodiment 1;

FIG. 2A to FIG. 2C are views illustrating a mode in which the sticking film piece 13 and the member to be stuck 20 are stuck to each other;

FIG. 14A to FIG. 14C are views illustrating the transfer and the sticking of a sticking film piece 13 according to a modification 1.

DETAILED DESCRIPTION OF THE PREFERRED EMBODIMENTS

Hereinafter, a sticking device according to the present invention is described based on embodiments illustrated in drawings. The respective views are schematic views and hence, the indication of sizes and angles does not always reflect actual sizes.

Embodiment 1

1. Configuration of Lamination Film 10 and Member to be Stuck 20

Prior to the description of a sticking device 100 according to the embodiment 1, the lamination film 10 and the member to be stuck 20 are described.

Figure 2C:
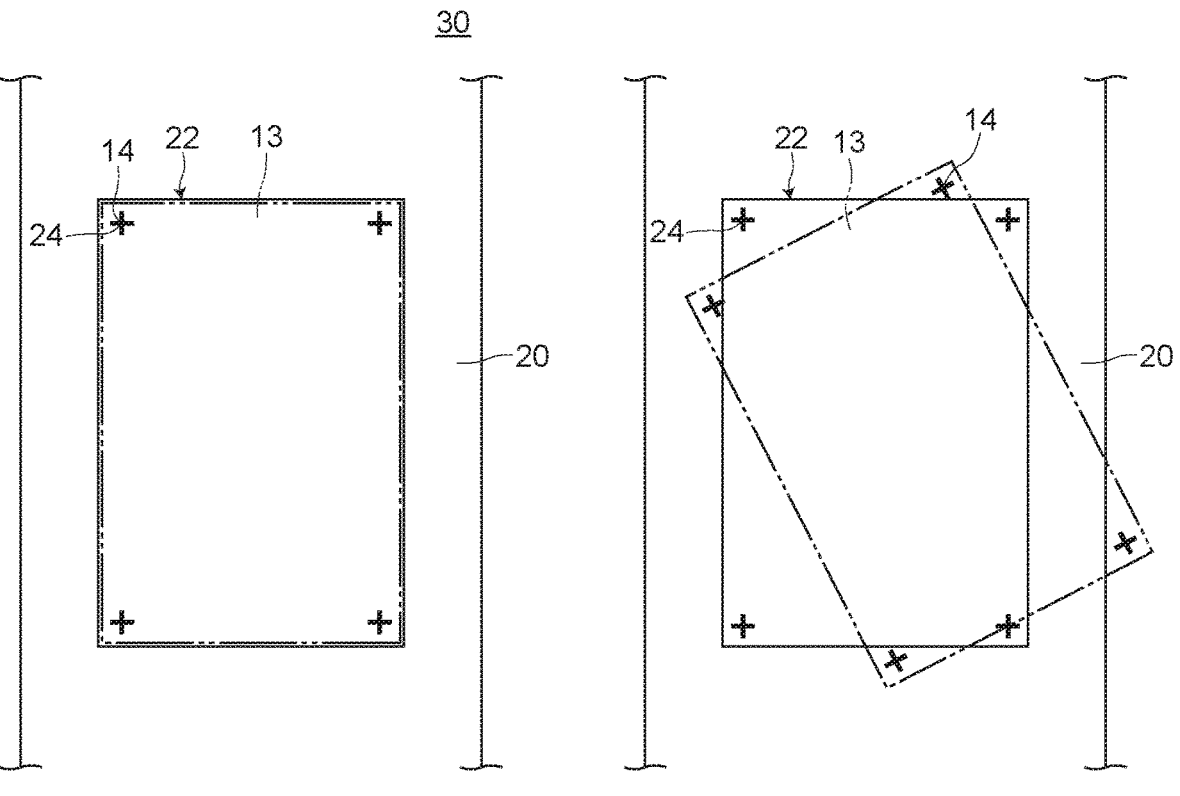
Figure 2C:
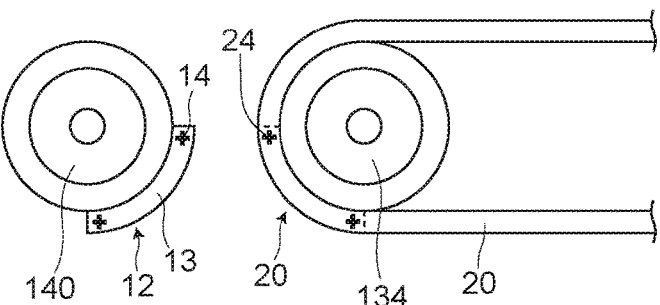

FIG. 1A to FIG. 1C are views illustrating the lamination film 10, the sticking film piece 13, and the member to be stuck 20 according to an embodiment 1. FIG. 1A is a cross-sectional view illustrating the lamination film 10, FIG. 1B is a plan view of the sticking film piece 13, and FIG. 1C is a plan view of the member to be stuck 20. FIG. 2A to FIG. 2C are views illustrating a mode in which the sticking film piece 13 and the member to be stuck 20 are stuck to each other. FIG. 2A illustrates a mode where the sticking film piece 13 is correctly stacked to the member to be stuck 20 at a predetermined position. FIG. 2B illustrates a mode where the sticking film piece 13 is stuck to the member to be stuck 20 in an inclined manner from the predetermined position. FIG. 2C illustrates a mode where the sticking film piece 13 is stuck to the member to be stuck 20 according to the embodiment 1.

The lamination film 10 is an elongated film (see FIG. 1A) where the release film 11 and a sticking film 12 are stacked to each other.

The release film 11 is made of a polyethylene terephthalate (PET) resin, for example, and protects a surface of a sticking surface of the sticking film 12. With the provision of the release film 11, the sticking film piece 13 can be easily transferred to the transfer roller 140 at the time of performing the transfer operation.

The sticking film 12 is a coverlay film that has a thermoplastic adhesive material layer on one surface of a coverlay film body. The thermoplastic adhesive material layer is formed such that the coverlay film can be peeled off from the release film 11 when the coverlay film is exposed to air at a room temperature, for example. Slits are formed in the sticking film 12 at a fixed interval so that the sticking film 12 is formed of sticking film pieces 13. The sticking film 12 may be a sticking film where the slits are formed in the sticking film 12 in advance. The sticking film 12 may be a sticking film where a forming unit that forms slits in the sticking film 12 may be mounted on the sticking device 100, and the sticking film pieces 13 may be formed before being transferred by the transfer roller 140. In the sticking film piece 13, alignment marks 14 are formed at the appropriate positions (four corners according to the embodiment 1) (see FIG. 1B).

The member to be stuck 20 may have an elongated film shape. The member to be stuck 20 is, for example, a flexible printed circuit board on which a conductive pattern is formed. In this embodiment, a wiring portion is protected by sticking the sticking film piece 13 in a predetermined region. In the member to be stuck 20, alignment marks 24 are formed at appropriate positions (four corners according to the embodiment 1) of a region 22 in which the sticking film piece 13 is stuck (see FIG. 1C).

As is the case of the conventional sticking device 900, when the position and the posture of the sticking film piece 13 on the transfer roller 140 cannot be adjusted, there is a possibility of the occurrence of displacement of the sticking film piece 13 with respect to the region 22 (see a solid line in FIG. 2B in which the sticking film piece 13 is stuck. Such displacement includes: the displacement of the sticking start point and the sticking finish position of the sticking film piece 13 (an upper side and a lower side illustrated in FIG. 2B by a solid line); the displacement of the inclination of the sticking film piece 13; and the displacement of the sticking film piece 13 in the width direction (a right side and a left side of a rectangular shape illustrated in FIG. 2B by a solid line), Accordingly, it is difficult to stick the sticking film piece 13 to the member to be stuck 20 with high accuracy.

To the contrary, in the sticking device 100 according to the embodiment 1, the sticking film piece 13 is transferred to a circumferential surface of the transfer roller 140 in a predetermined transfer region A1, the position and the posture of the sticking film piece 13 on the transfer roller 140 are adjusted and, thereafter (see FIG. 2C and FIG. 8A and FIG. 8B)), the sticking film piece 13 is stuck to the member to be stuck 20 by the transfer roller 140 in a predetermined sticking region A2 thus manufacturing a product to which the sticking film piece 13 is stuck (see FIG. 2A).

2. Configuration of Sticking Device 100 According to Embodiment 1

Figure 3:
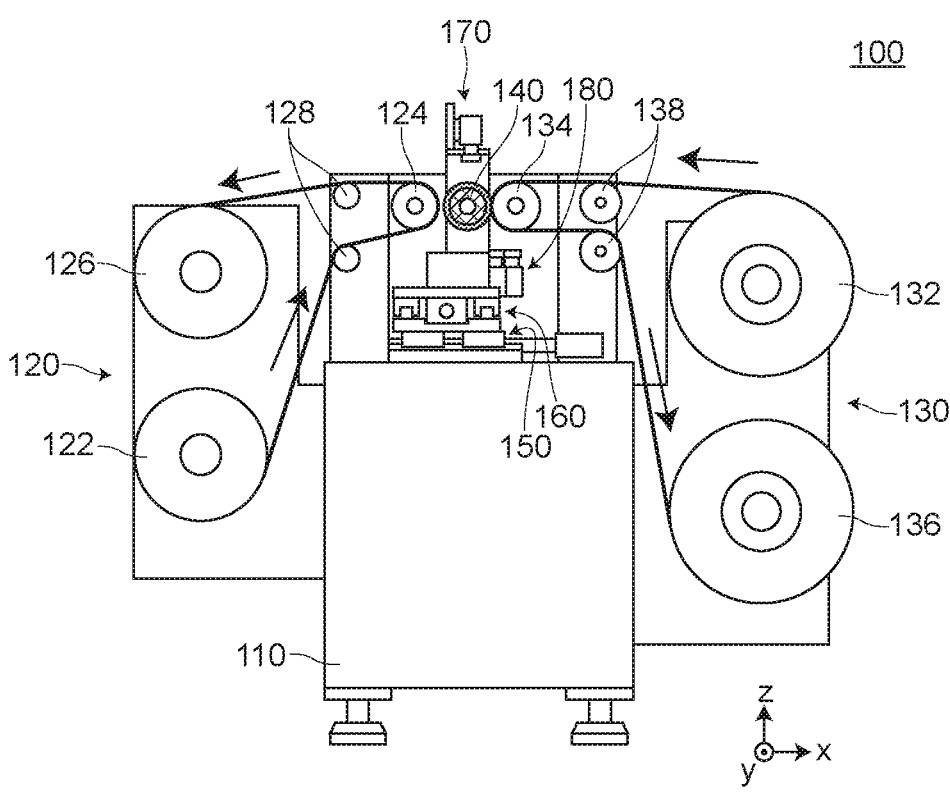
FIG. 3 is a cross-sectional view of a sticking device 100 according to the embodiment 1.
Figure 4:
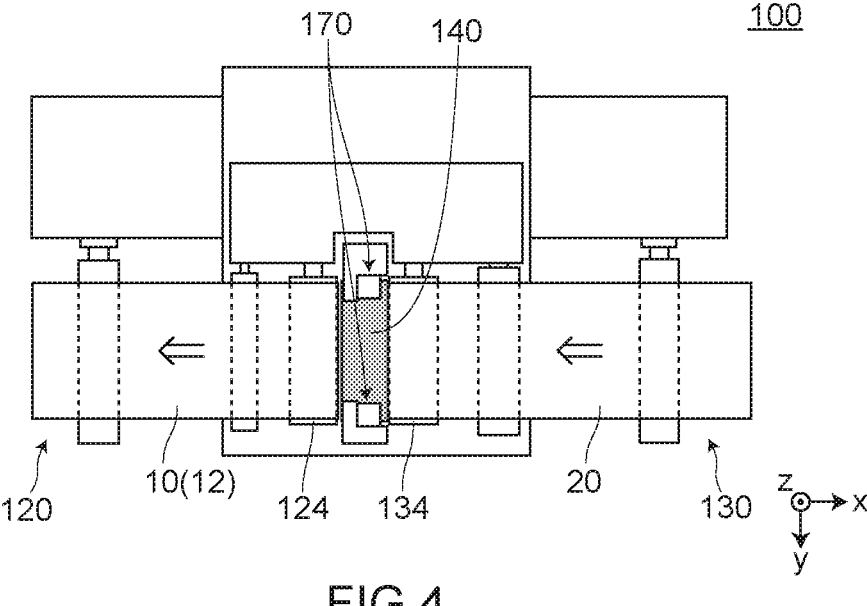
FIG. 4 is a plan view of the sticking device 100 according to the embodiment 1.
Figure 5:
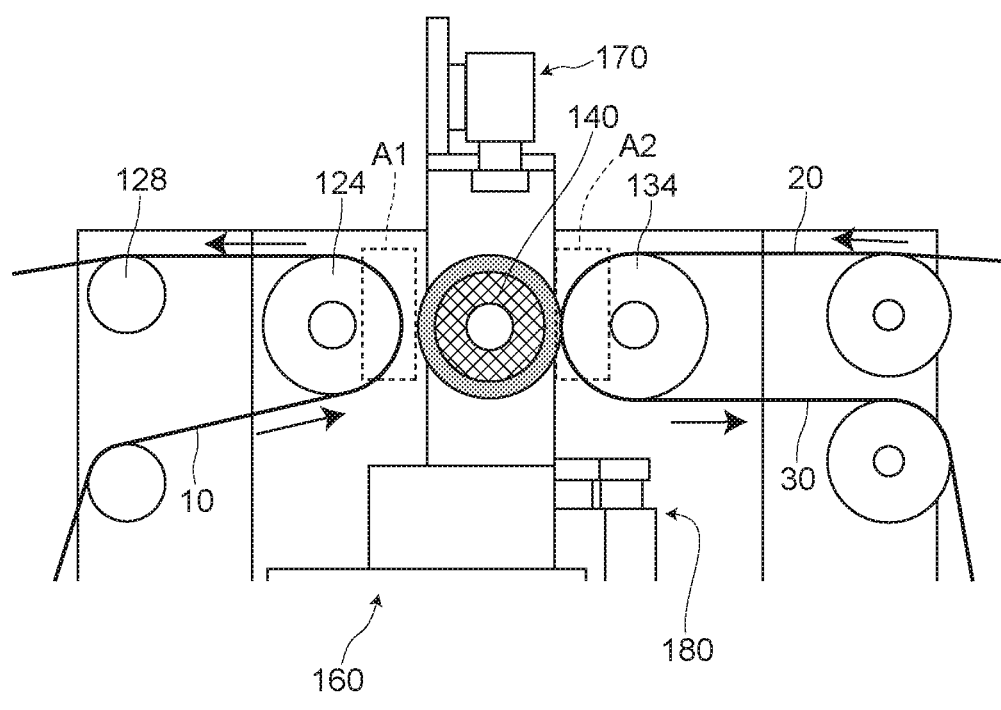
FIG. 5 is an enlarged cross-sectional view of a main part of the sticking device 100 according to the embodiment 1.

Next, the configuration of the sticking device 100 according to the embodiment 1 is described. FIG. 3 is a cross-sectional view of a sticking device 100 according to the embodiment 1. FIG. 4 is a plan view of a main part of the sticking device 100 according to the embodiment 1. FIG. 5 is an enlarged cross-sectional view of the main part of the sticking device 100 according to the embodiment 1. For the sake of brevity, according to the embodiment 1, the direction directed from an axis of a lamination film feed roller 124 to an axis of a member-to-be-stuck feed roller 134 is set as an x direction, and a direction perpendicular to the x direction on the same plane is set as a y direction, and a vertical direction is set as a z direction.

Figure 7:
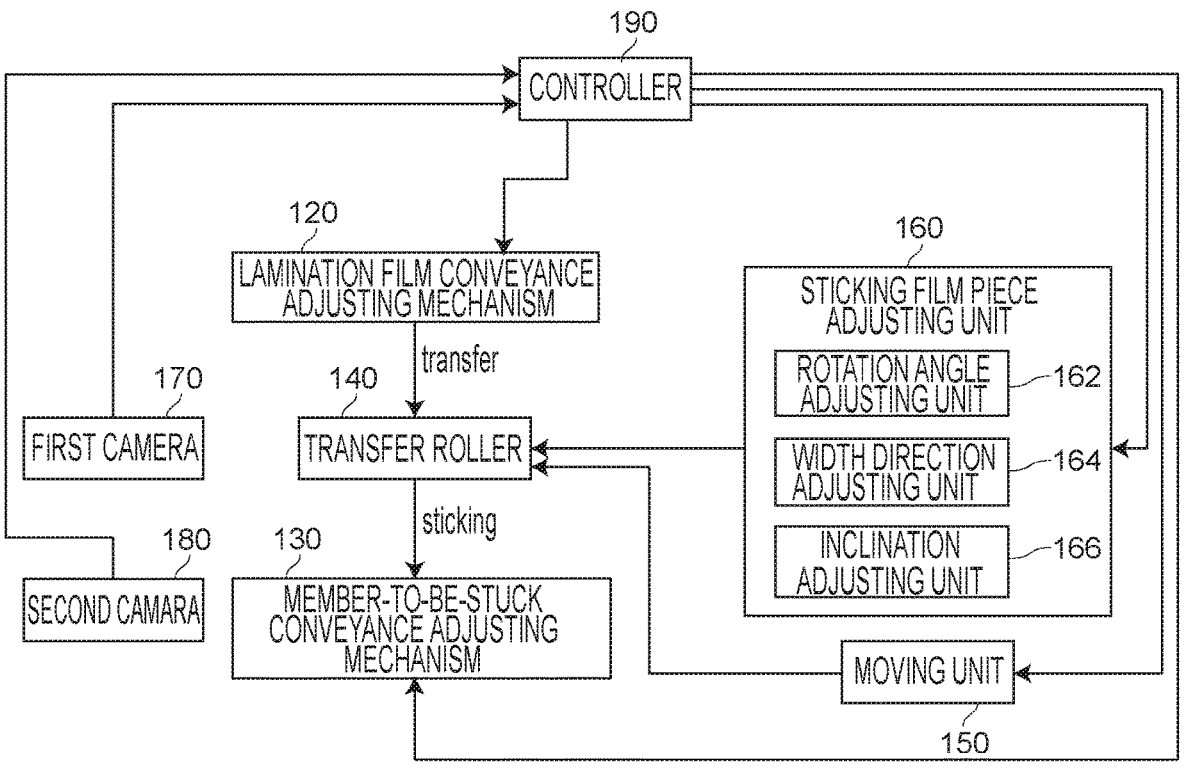
FIG. 7 is a block diagram of the sticking device 100 according to the embodiment 1.

As illustrated in FIG. 3 to FIG. 5, the sticking device 100 according to the embodiment 1 includes a base 110, a lamination film conveyance adjusting mechanism 120, a member-to-be-stuck conveyance adjusting mechanism 130, the transfer roller 140, a moving unit 150, a sticking film piece adjusting unit 160, a first camera 170, a second camera 180, and a controller 190 (see FIG. 7). In the sticking device 100 according to the embodiment 1, other constitutional elements are mounted on the base 110. The lamination film conveyance adjusting mechanism 120 is disposed on a −x direction side of the base 110, and the member-to-be-stuck conveyance adjusting mechanism 130 is disposed on a +x direction side of the base 110. The controller 190 described later is accommodated in the base 110.

As described in Fig. and FIG. 4, the lamination film conveyance adjusting mechanism 120 includes: a pay-off roller 122 that pays off the lamination film 10 in the +x direction from below such that the release film 11 is disposed on an each roller side, a lamination film feed roller 124 that feeds the lamination film 10 conveyed from the pay-off roller 122 in the −x direction while rotating; a winding roller 126 that winds the release film 11; and auxiliary rollers 128 that assist the feeding of the lamination film 10 in the conveyance direction. The transfer roller 140 transfers the sticking film piece 13 in a region on a transfer roller 140 side on a circumferential surface of the lamination film feed roller 124. Accordingly, a region on a member-to-be-stuck feed roller 134 side on the circumferential surface of the lamination film feed roller 124 forms a transfer region A1.

The member-to-be-stuck conveyance adjusting mechanism 130 includes: a pay-off roller 132 that pays off the member to be stuck 20 in the −x direction; the member-to-be-stuck feed roller 134 that feeds the member to be stuck 20 (product 30) that is conveyed from the pay-off roller, that is, the member to be stuck 20 to which the sticking film piece 13 is stuck, in the +x direction while rotating; a winding roller 136 that winds the member to be stuck 20 (product 30) to which the sticking film piece 13 is laminated; and an assist roller 138 that assists the feeding of the member to be stuck 20 in the conveyance direction The transfer roller 140 sticks the sticking film piece 13 to the member to be stuck 20 in a region of a circumferential surface of the member-to-be-stuck feed roller 134 on a transfer roller 140 side. Accordingly, a region of the circumferential surface of the member-to-be-stuck feed roller 134 on a lamination film feed roller 124 side forms a sticking region A2. The transfer region A1 and the sticking region A2 are disposed at positions opposite to each other.

The transfer roller 140 transfers the sticking film piece 13 on the circumferential surface in the transfer region A1 on the lamination film feed roller 124, and sticks the sticking film piece 13 to the member to be stuck 20 in the sticking region A2 on the member-to-be-stuck feed roller 134. The transfer roller 140 is configured to be rotatable about an axis extending in the approximately y direction. The transfer roller 140 is an adhesive roller on a surface of which an adhesive material (for example, rubber having an adhesive property) is disposed. The adhesive material may be disposed only on the surface, or the transfer roller 140 itself may be made of the adhesive material. An adhesive strength of the transfer roller 140 is larger than an adhesive strength between the sticking film 12 and the release film 11 of the lamination film 10. The lamination film feed roller 124, the transfer roller 140 and the member-to-be-stuck feed roller 134 are arranged side by side in the direction orthogonal to an axis of the lamination film feed roller 124. Namely, the lamination film feed roller 124, the transfer roller 140 and the member-to-be-stuck feed roller 134 are arranged side by side in a straight-line shape along the x direction to be more specific, being arranged side by side along the direction orthogonal to the axis of the lamination film feed roller 124 as a whole although some displacement occurs due to the adjustment. The transfer roller 140 is disposed between the lamination film feed roller 124 and the member-to-be-stuck feed roller 134, and moves between the lamination film feed roller 124 and the member-to-be-stuck feed roller 134.

In the transfer of the sticking film piece 13 on the circumferential surface of the transfer roller 140, the moving unit 150 moves the transfer roller 140 to the transfer region A1 (more specifically, a region where the transfer roller 140 is brought into contact with the sticking film piece 13 on the lamination film feed roller 124). In a succeeding stage that follows the transferring of the sticking film piece 13 to the circumferential surface of the transfer roller 140, the transfer roller 140 is moved to the position away from both the transfer region A1 and the sticking region A2 (the position away from both the lamination film feed roller 124 and the member-to-be-stuck feed roller 134). In sticking the sticking film piece 13 to the member to be stuck 20, the transfer roller 140 is moved to the sticking region A2 (to be more specific, the region where the transfer roller 140 is brought into contact with the member to be stuck 20 on the member-to-be-stuck feed roller 134. That is, the moving unit 150 moves the transfer roller 140 between the lamination film feed roller 124 and the member-to-be-stuck feed roller 134 (x direction and −x direction) in a reciprocating manner. As the moving unit 150, a suitable configuration may be used. For example, a rail extending in the x direction may be disposed on the base 110, a pedestal portion on which the sticking film piece adjusting unit 160, the transfer roller 140 and the first camera 170 are mounted is disposed on the rail, and the pedestal portion is moved along the rail by a motor or the like. Also in a preceding stage that is performed before the transferring of the sticking film piece 13 to the circumferential surface of the transfer roller 140, the transfer roller 140 may be moved to the position away from both the transfer region A1 and the sticking region A2.

The sticking film piece adjusting unit 160 adjusts the position and the posture of the sticking film piece 13 on the circumferential surface of the transfer roller 140 such that the sticking film piece 13 assumes the position and the posture that correspond to the position and the posture of the member to be stuck 20 when the sticking film piece 13 is stuck to the member to be stuck 20 at the position away from both the transfer region A1 and the sticking region A2. The sticking film piece adjusting unit 160 includes a rotation angle adjusting unit 162, a width direction adjusting unit 164, and an inclination adjusting unit 166.

The rotation angle adjusting unit 162 adjusts a sticking start position of the sticking film piece 13 on the circumferential surface of the transfer roller 140. The rotation angle adjusting unit 162 is a servo motor that adjusts a rotation angle of the transfer roller 140.

The width direction adjusting unit 164 is a y-axis direction moving unit that adjusts the position in the width direction of the sticking film piece 13 that corresponds to the width direction (y direction) of the member to be stuck 20. Although any suitable configuration can be used as the width direction adjusting unit 164, for example, the configuration may be adopted where a rail extending in the y direction is disposed on the pedestal portion of the moving unit 150, a second pedestal portion on which the inclination adjusting unit 166, the transfer roller 140 and the first camera 170 are mounted is disposed, and the second pedestal portion is moved along the rail by a motor or the like.

The inclination adjusting unit 166 adjusts an angle of the transfer roller 140 with respect to a sticking angle of the member to be stuck 20. Here, "sticking angle" means an angle of a predetermined side of the member to be stuck 20 from a reference in the region 22 where the sticking film piece 13 is stuck (for example, an angle of the side of the member to be stuck 20 along the conveyance direction from the −x direction). To accurately stack the sticking film piece 13, an angle of the transfer roller 140 is adjusted such that the region in which the sticking film piece 13 is stuck to the member to be stuck 20 and the sticking film piece 13 are aligned with each other straightly. In this embodiment 1, the angle of the transfer roller 140 with respect to the sticking angle is an angle that corresponds to an angle of an axis of the transfer roller 140 with respect to the axis of the member-to-be-stuck feed roller 134.

Figure 6:
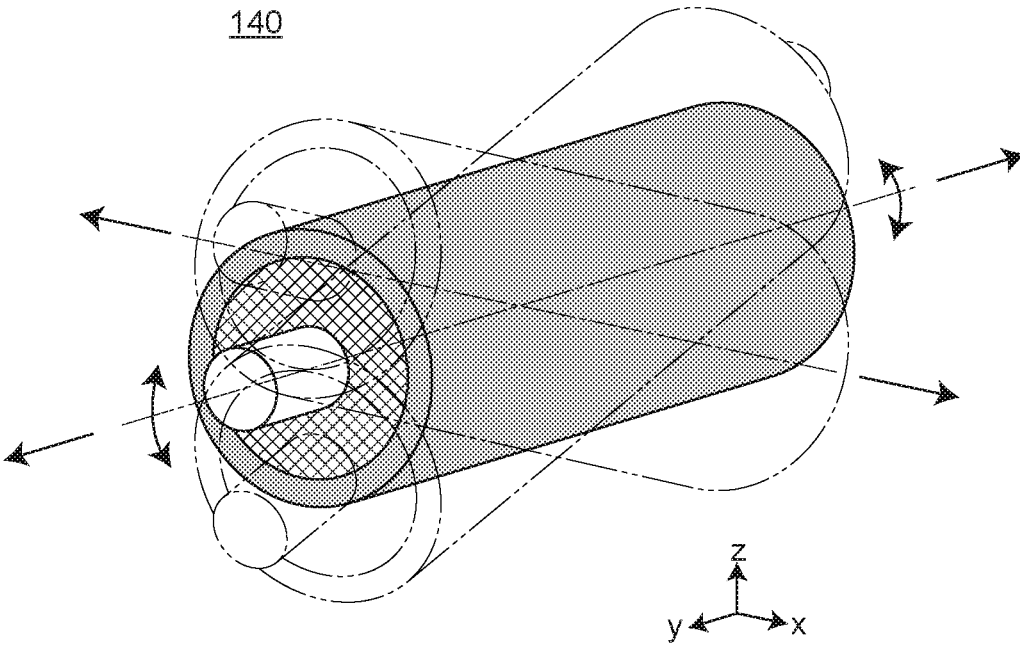
FIG. 6 is a schematic view illustrating a mode where the posture of a transfer roller 140 according to the embodiment 1 is adjusted.

The inclination adjusting unit 166 controls the inclination of the transfer roller 140 by lifting or lowering at least one of an end portion of the transfer roller 140 on the +y direction and an end portion of the transfer roller 140 on the −y direction toward the z direction (see FIG. 6).

The first camera 170 is disposed above the transfer roller 140, and detects the position and the posture of the sticking film piece 13 transferred to the transfer roller 140. According to the embodiment 1, the alignment marks are formed on four corners of the sticking film piece 13 and hence, the alignment marks are disposed at respective end portions of the transfer roller 140 in the y direction. A detection result of the first camera 170 is transmitted to the controller 190.

The second camera 180 is disposed below the member-to-be-stuck feed roller 134, and detects the position and the posture of the member to be stuck 20, and the position and the posture of the sticking film piece 13 stacked to the member to be stuck 20. According to the embodiment 1, the alignment marks 24 are formed at four corners of the region where the sticking film piece 13 is stuck to the member to be stuck 20. Accordingly, each alignment mark 24 is disposed at the corresponding position of the region. A detection result of the second camera 180 is transmitted to the controller 190.

As illustrated in FIG. 7, based on the detection results of the first camera 170 and the second camera 180, the controller 190 controls the operations of the lamination film conveyance adjusting mechanism 120, the member-to-be-stuck conveyance adjusting mechanism 130, the moving unit 150, and the sticking film piece adjusting unit 160. The controller 190, based on the detection result of the second camera 180, transmits signals to the sticking film piece adjusting unit 160 and the member-to-be-stuck conveyance adjusting mechanism 130. The sticking film piece adjusting unit 160 and the member-to-be-stuck conveyance adjusting mechanism 130 adjust the sticking start position of the sticking film piece 13 on the circumferential surface of the transfer roller 140 by the rotation angle adjusting unit 162. The sticking film piece adjusting unit 160 and the member-to-be-stuck conveyance adjusting mechanism 130 adjust the width direction of the sticking film piece 13 by the width direction adjusting unit 163. The sticking film piece adjusting unit 160 and the member-to-be-stuck conveyance adjusting mechanism 130 adjust an angle of the transfer roller 140 with respect to a sticking angle of the member to be stuck 20 and the conveyance position of the member to be stuck 20 by the inclination adjusting unit 166.

3. Method of Adjusting Sticking Film Piece 13 in Embodiment 1

Figure 8A:
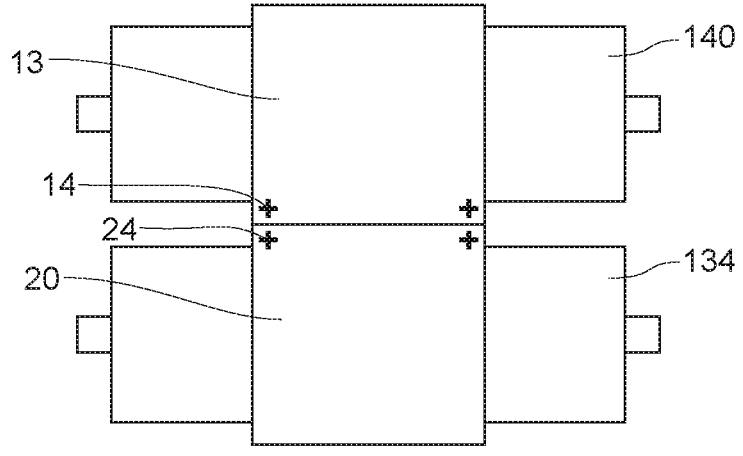
FIG. 8A and FIG. 8B are views illustrating a mode where a sticking film piece 13 is adjusted by a sticking film piece adjusting unit 160.
Figure 8B:
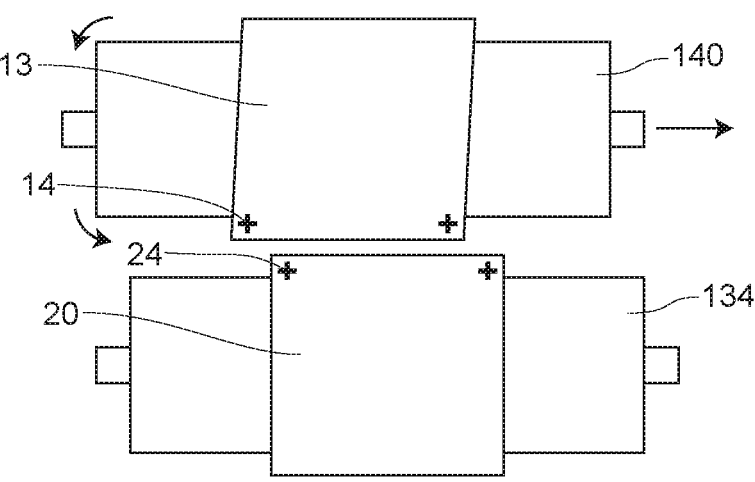

Next, the method of adjusting the sticking film piece 13 by the sticking film piece adjusting unit 160 is described. FIG. 8A and FIG. 8B are views illustrating a method where the sticking film piece 13 is adjusted by the sticking film piece adjusting unit 160. FIG. 8A illustrates a mode where the sticking film piece 13 is stuck to the member to be stuck 20 in the correct posture without adjusting the transfer roller 140. FIG. 8A illustrates a mode of the sticking film piece 13 and the transfer roller 140 before the adjustment is performed by the sticking film piece adjusting unit 160 in a case where the sticking film piece 13 is transferred to the member to be stuck 20 in an incorrect posture with respect to a sticking angle of the member to be stuck 20.

The sticking film piece adjusting unit 160 adjusts the position and the posture of the sticking film piece 13 on the circumferential surface of the transfer roller 140 such that the position and the posture becomes the position and the posture that correspond to the position and the posture of the member to be stuck 20 when the sticking film piece 13 is stuck to the member to be stuck 20 at the position spaced apart from both the transfer region A1 and the sticking region A2.

(1) In a Case Where Sticking Film Piece 13 is Transferred to Circumferential Surface of Roller 140 at the Correct Position and in the Correct Posture In the case where the sticking film piece 13 is transferred to the circumferential surface of the transfer roller 140 at the correct position and in the correct posture, as illustrated in FIG. 8A, the member to be stuck 20 is stuck by adjusting the sticking start position of the sticking film piece 13 on the circumferential surface of the transfer roller 140 without adjusting the position of the sticking film piece 13 in the width direction and the angle of the transfer roller 140 by the sticking film piece adjusting unit 160.

(2) In a Case Where Sticking Film Piece 13 is Transferred to Circumferential Surface of Transfer Roller 140 at Incorrect Position and in Incorrect Posture In a case where the sticking film piece 13 is transferred to the circumferential surface of the transfer roller 140 at the incorrect position and in the incorrect posture (for example, an angle of the sticking film piece 13 is displaced with respect to a sticking angle of the member to be stuck 20), as illustrated in FIG. 8B, not only the sticking start position of the sticking film piece 13 on the circumferential surface of the transfer roller 140 is adjusted, but also the position in the width direction of the sticking film piece 13 that corresponds to the position of the member to be stuck 20 in the width direction is adjusted (the transfer roller 140 being moved toward a right side in FIG. 8A). Further, an angle of the transfer roller 140 with respect to a sticking angle of the member to be stuck 20 is adjusted (the transfer roller 140 being inclined such that a left side becomes low and a right side becomes high in FIG. 8A or, alternatively, the transfer roller 140 being rotated in a counterclockwise direction). With such an operation, it is possible to make the sticking film piece 13 take the correct posture so that it is possible to stick the sticking film piece 13 to the member to be stuck 20.

4. Method of Sticking the Sticking Film Piece 13 in Embodiment 1

Figure 9A:
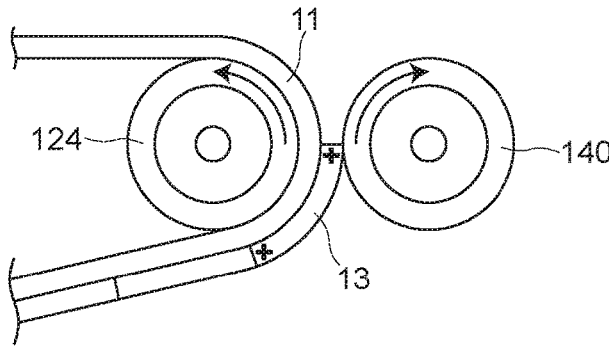
FIG. 9A to FIG. 9C are views illustrating a mode where the sticking film piece 13 is transferred from a release film 11 to the transfer roller 140.
Figure 9A:
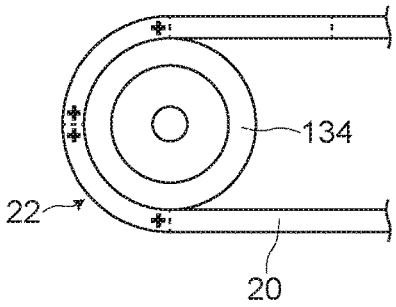
Figure 9B:
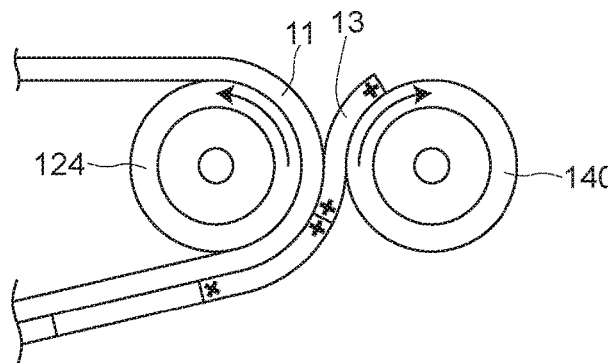
Figure 9B:
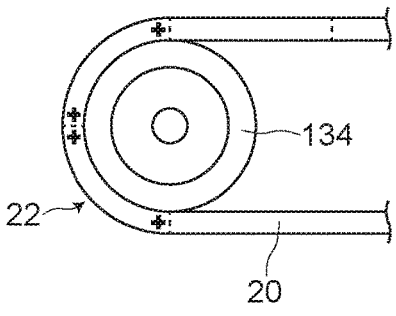
Figure 9C:
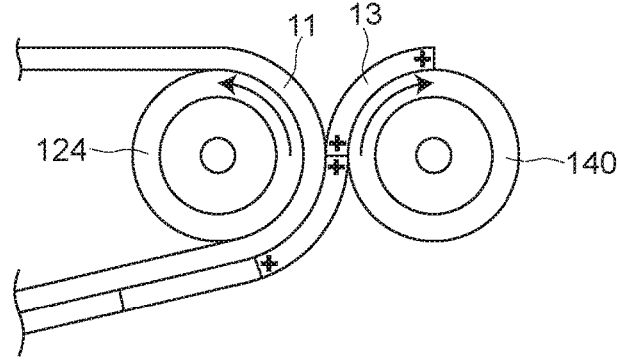
Figure 9C:
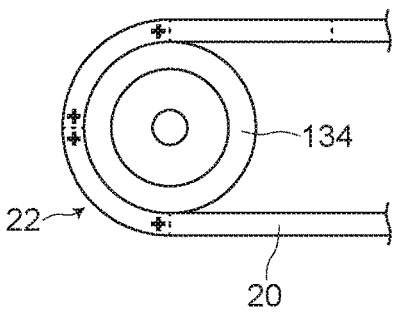
Figure 10A:
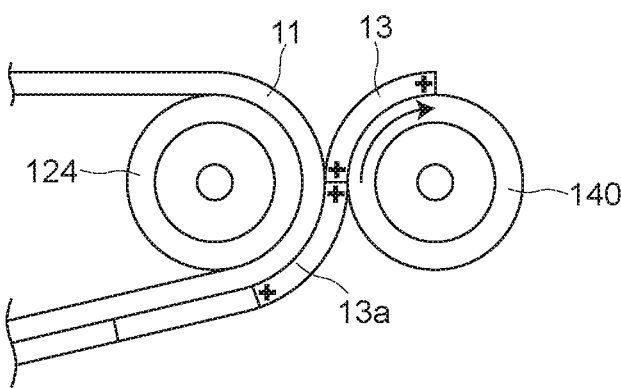
FIG. 10A to FIG. 10D are views illustrating a mode where a distal end of sticking film piece 13a is provisionally peeled off in a next step when the sticking film piece 13 is transferred to the transfer roller 140.
Figure 10B:
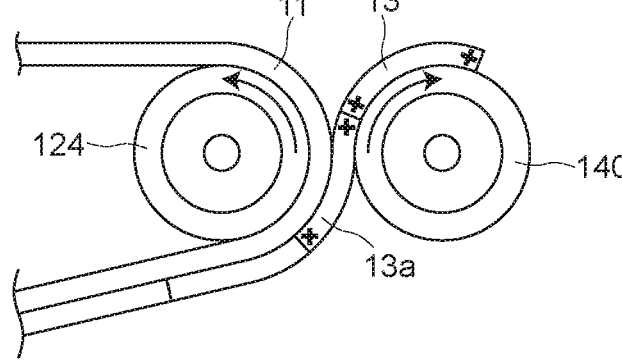
Figure 10C:
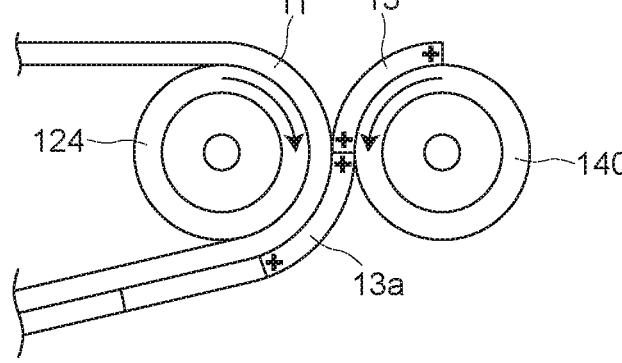
Figures 11A, 11B, 11C:
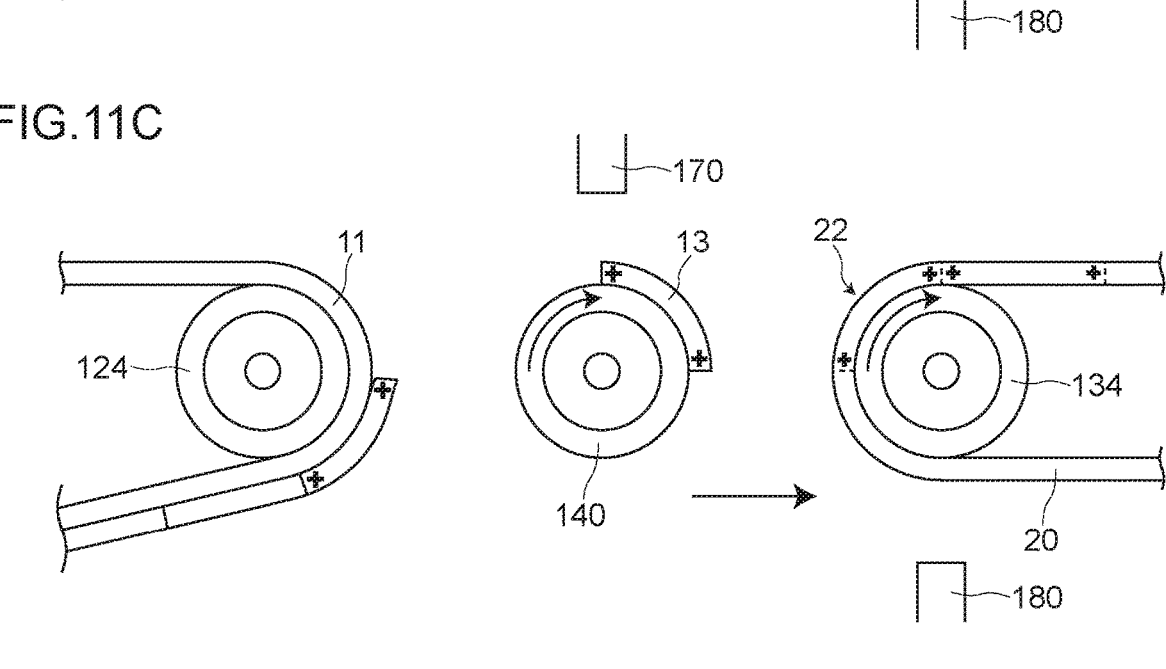
FIG. 11A to FIG. 11C are views illustrating a mode where the position and the posture of the sticking film piece 13 are detected, and the position of the member to be stuck 20 is detected.
Figure 12A:
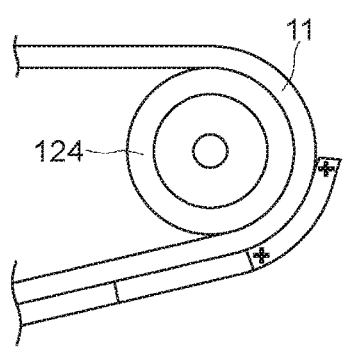
FIG. 12A to FIG. 12C are views illustrating a mode where the sticking film piece 13 is stuck to the member to be stuck 20.
Figure 12A:
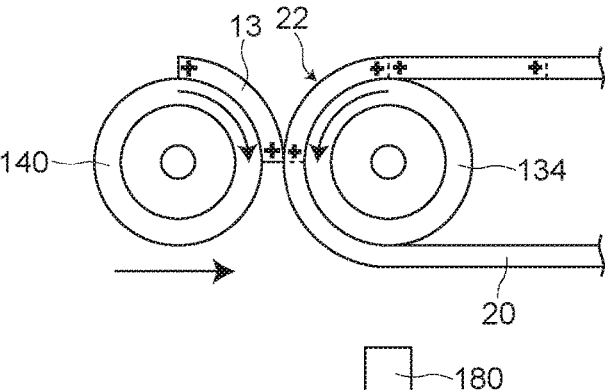
Figure 12B:
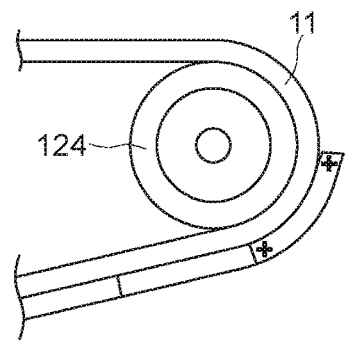
Figure 12B:
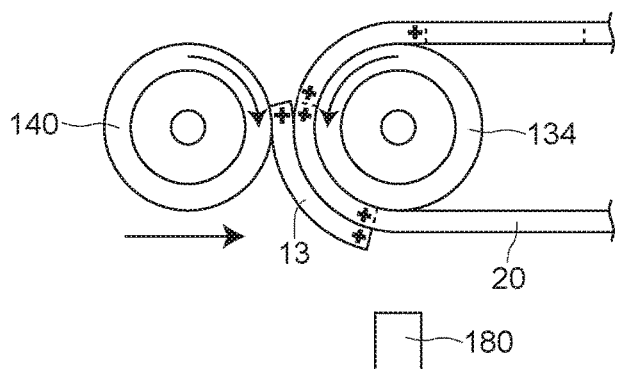
Figure 12C:
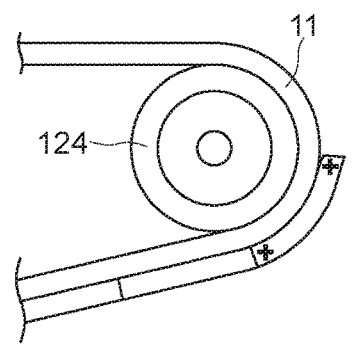
Figure 12C:
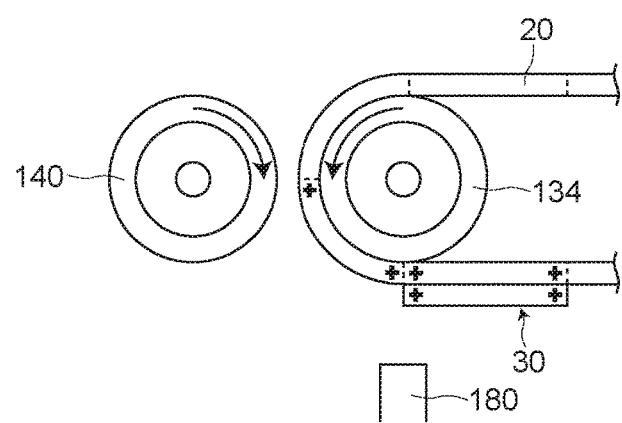

Next, the method of sticking the sticking film piece 13 according to the embodiment 1 is described. FIG. 9A to FIG. 9C are views illustrating a mode where the sticking film piece 13 is transferred from the release film 11 to the sticking film piece 13. FIG. 9A to FIG. 9C are respective step views. FIG. 10A to FIG. 10D are views illustrating a mode where, at the time of performing the transfer of the sticking film piece 13 to the transfer roller 140, a distal end of the sticking film piece 13 in a next step is provisionally peeled off. FIG. 10A to FIG. 10C are respective step views. FIG. 11A to FIG. 11C are views illustrating a mode where the position and the posture of the sticking film piece 13 are detected, and the position of the member to be stuck 20 is detected. FIG. 11A to FIG. 11C are respective step views. FIG. 12A to FIG. 12C are views illustrating a mode where the sticking film piece 13 is stuck to the member to be stuck 20. FIG. 12A to FIG. 12C are respective step views.

The method of sticking the sticking film piece 13 according to the embodiment 1 includes: a sticking film piece transfer step; a sticking film piece adjusting step; and a sticking film piece sticking step in this order.

(1) Sticking Film Piece Transfer Step

First, the lamination film 10 is fed onto the lamination film feed roller 124 by the lamination film conveyance adjusting mechanism 120. The lamination film feed roller 124 feeds the lamination film 10 from a lower side to an upper side as illustrated in FIG. 9A. Then, using the moving unit 150, the transfer roller 140 is moved to the position where the transfer roller 140 is brought into contact with a distal end portion of the lamination film 10 on the lamination film feed roller 124 (transfer region A1) (see FIG. 9A).

Next, the sticking film piece 13 is transferred to the circumferential surface of the transfer roller 140 by rotating the transfer roller 140 in the direction opposite to the rotating direction of the lamination film feed roller 124 (in a clockwise direction in FIG. 9B).

At this stage of the operation, a terminal end portion of the sticking film piece 13 is transferred to the transfer roller 140, and a distal end portion of the sticking film piece 13a that is transferred to the transfer roller 140 in the next phase is also released from the release film 11 and is transferred to the transfer roller 140 (see FIG. 10A and FIG. 10B).

Next, by rotating the transfer roller 140 reversely, the distal end portion of the sticking film piece 13a is returned onto the release film 11 (see FIG. 10C).

Figure 10D:
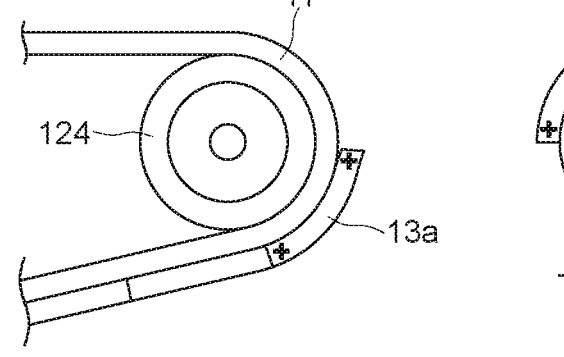
Figure 10D:
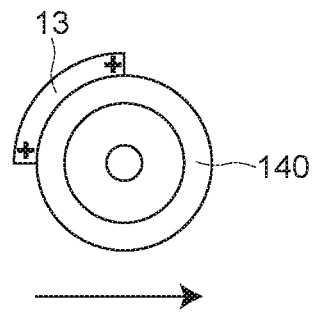

Next, by moving the transfer roller 140 to a member-to-be-stuck 20 side (x direction) by the moving unit 150, the transfer roller 140 is moved away from the lamination film feed roller 124 (see FIG. 10D).

(2) Sticking Film Piece Adjusting Step

Next, the transfer roller 140 is rotated in the clockwise direction at the position away from both the transfer region A1 (the lamination film feed roller 124) and the sticking region A2 (the member-to-be-stuck feed roller 134), and the sticking start position of the sticking film piece 13 on the transfer roller 140 is detected by the first camera 170 (see FIG. 11A). Next, the transfer roller 140 is further rotated in the clockwise direction, and the first camera 70 detects the sticking finish position of the sticking film piece 13 (see FIG. 11B). At this stage of the operation, the sticking film piece adjusting unit 160 adjusts the position and the posture of the sticking film piece 13 on the circumferential surface of the transfer roller 140 such that the position and the posture becomes the position and the posture that correspond to the position and the posture of the member to be stuck 20 when the sticking film piece 13 is stuck to the member to be stuck 20 (see FIG. 8A and FIG. 8B). Further, the sticking film piece adjusting unit 160 adjusts a rotation angle of the transfer roller 140 such that, when the sticking start position of the sticking film piece 13 agrees with the sticking start position of the sticking film piece 13 on the member to be stuck 20 when the sticking film piece 13 is brought into contact with the member to be stuck 20.

Further, the member-to-be-stuck conveyance adjusting mechanism 130 feeds the member to be stuck 20, and the second camera detects the sticking start position of the sticking film piece 13 on the member to be stuck 20 (see FIG. 11A). Next, the member-to-be-stuck conveyance adjusting mechanism 130 further feeds the member to be stuck 20, and the second camera detects the sticking finish position of the sticking film piece 13 on the member to be stuck 20 (see FIG. 11B). Next, the member-to-be-stuck conveyance adjusting mechanism 130 conveys the member to be stuck 20 in the reverse direction such that the sticking start position of the member to be stuck 20 is positioned in the sticking region A2 (the position where the member to be stuck 20 is brought into contact with the transfer roller 140) (see FIG. 11C).

(3) Sticking Film Piece Sticking Step

Next, the transfer roller 140 is moved toward the member-to-be-stuck feed roller 134 side (+y side) by the moving unit 150, and the transfer roller 140 is rotated such that the sticking start position of the sticking film piece 13 agrees with the sticking start position of the sticking film piece 13 on the member to be stuck 20 ((see FIG. 12A). Then, the transfer roller 140 and the member-to-be-stuck feed roller 134 are rotated so as to stick the sticking film piece 13 to the member to be stuck 20 (see FIG. 12B)

Then, the second camera 180 checks a sticking state at the sticking start position and the sticking finish position of the sticking film piece 13. At the time of checking the lamination at the sticking finish position of the sticking film piece 13, it is possible to perform the detection of the sticking start position of the member to be stuck 20 in the next phase. The transfer roller 140 that finishes the lamination of the sticking film piece 13 moves in the lamination film feed roller 124 side (−x direction) (see FIG. 12C).

By repeating the above-mentioned steps hereinafter, it is possible to stick the sticking film piece 13 to the member to be stuck 20 with high productivity.

5. Advantageous Effects Acquired by Sticking Device 100 According to Embodiment 1

The sticking device 100 according to the embodiment 1 includes the sticking film piece adjusting unit 160 that adjusts the position and the posture of the sticking film piece 13 on the circumferential surface of the transfer roller 140 such that the sticking film piece 13 takes the position corresponding to the position and the posture of the member to be stuck 20 when the sticking film piece 13 is stuck to the member to be stuck 20, at the position that is spaced apart from both the transfer region A1 and the sticking region A2. Accordingly, even when the posture of the transfer roller 140 is adjusted, the conveyance of the lamination film 10 and the conveyance of the member to be stuck 20 are not affected by such adjustment. Accordingly, the posture of the transfer roller 140 can be adjusted and hence, the sticking can be performed with high accuracy.

Further, according to the sticking device 100 of the embodiment 1, the sticking film piece adjusting unit 160 includes the rotation angle adjusting unit 162, the width direction adjusting unit 164 and the inclination adjusting unit 166. Accordingly, it is possible to finely adjust the position and the posture of the sticking film piece 13 on the circumferential surface of the transfer roller 140 such that the sticking film piece 13 takes the position corresponding to the position and the posture of the member to be stuck 20.

Further, the sticking device 100 according to the embodiment 1 also includes: the lamination film feed roller 124 that feeds the lamination film 10 formed by stacking the sticking film piece 13 and the release film 11; and the member-to-be-stuck feed roller 134 that feeds the member to be stuck 20. Accordingly, it is unnecessary to prepare a table for the transfer and a table for sticking and hence, an area that the device occupies can be made small. Further, it is also unnecessary to provide these tables with a facility that suctions the lamination film 10 and the member to be stuck 20. Also, from this point of view, the area that the device occupies can be made small.

The sticking device 100 according to the embodiment 1 also includes: the lamination film feed roller 124 that feeds the lamination film 10 formed by stacking the sticking film piece 13 and the release film 11; and the member-to-be-stuck feed roller 134 that feeds the member to be stuck 20. As a result, the sticking film piece 13 is disposed along the circumferential surface of the lamination film feed roller 124. Accordingly, an area that the device occupies can be made small and compact compared to a case where the lamination film is disposed on a table having a flat surface and is transferred. In the same manner, the member to be stuck 20 is disposed along the circumferential surface of the member-to-be-stuck feed roller 134. Accordingly, an area that the device occupies can be made small and compact compared to a case where the member to be stuck 20 is disposed on a table having a flat surface and is transferred.

Further, the sticking device 100 according to the embodiment 1 includes the first camera 170 that detects the position and the posture of the sticking film piece 13 that is transferred onto the transfer roller 140. The sticking film piece adjusting unit 160 adjusts the sticking start position, the width direction of the sticking film piece 13 and an angle of the transfer roller with respect to a sticking angle of the member to be stuck 20 based on a detection result of the first camera 170. Accordingly, the sticking film piece 13 can be detected with high accuracy by checking the sticking start position and the posture of the sticking film piece 13.

The sticking device 100 according to the embodiment 1 further includes: the second camera 180 that detects the position and the posture of the member to be stuck 20, and the position and the posture of the sticking film piece 13 stuck to the member to be stuck 20; and the member-to-be-stuck conveyance adjusting mechanism 130 that adjusts the conveyance of the member to be stuck 20. The sticking film piece adjusting unit 160 and the member-to-be-stuck conveyance adjusting mechanism 130, based on a detection result of the second camera 180, adjusts the sticking start position of the sticking film piece 13 on the circumferential surface of the transfer roller 140, the width direction of the sticking film piece 13, an angle of the transfer roller 140 with respect to a sticking angle of the member to be stuck 20, and the conveyance position of the member to be stuck 20. Accordingly, it is possible to stick the sticking film piece 13 to the member to be stuck 20 in a state where the sticking film piece 13 and the member to be stuck 20 are positioned with high accuracy by operating the transfer roller 140 and the member-to-be-stuck conveyance adjusting mechanism 130 in an interlocking manner.

Further, in the sticking device 100 according to the embodiment 1, the moving unit 150 is a unit that moves the transfer roller 140. Accordingly, compared to a case where the lamination film conveyance adjusting mechanism 120 or the member-to-be-stuck conveyance adjusting mechanism

130 is moved, the mechanism becomes small and an area that the mechanism occupies also becomes small.

The sticking device 100 according to the embodiment 1 further includes: the lamination film feed roller 124 that feeds the lamination film 10 formed by stacking the sticking film piece 13 and the release film 11 to each other; and the member-to-be-stuck feed roller 134 that feeds the member to be stuck 20. Accordingly, it is possible to position the transfer region A1 and the sticking region A2 such that the transfer region A1 and the sticking region A2 face each other with the transfer roller 140 sandwiched between the transfer region A1 and the sticking region A2. Accordingly, a distance that the transfer roller 140 is moved by the moving unit 150 becomes short and hence, the operation can be performed at a high speed.

Further, in the sticking device 100 according to the embodiment 1, the lamination film feed roller 124, the transfer roller 140 and the member-to-be-stuck feed roller 134 are arranged side by side along the direction that intersects with an axis of the lamination film feed roller 124, and the transfer roller 140 is disposed between the lamination film feed roller 124 and the member-to-be-stuck feed roller 134. Accordingly, the distance that the transfer roller 140 moves by the moving unit 150 can be made small and hence, the sticking film piece 13 can be stuck with high productivity.

Further, in the sticking device 100 according to the embodiment 1, the transfer roller 140 can be rotated in a normal direction as well as in a reverse direction. Accordingly, in transferring the sticking film piece 13, a distal end portion of a sticking film piece 13a in the next phase can be temporarily peeled off and, then, can be returned (see FIG. 10A to FIG. 10D). Accordingly, the sticking film piece 13a can be easily peeled off from the release film 11 in the next phase without additionally performing a step such as provisional peeling. As a result, the sticking film piece 13 can be stuck to the member to be stuck 20 with high productivity.

Embodiment 2

Figures 13A, 13B, 13C:
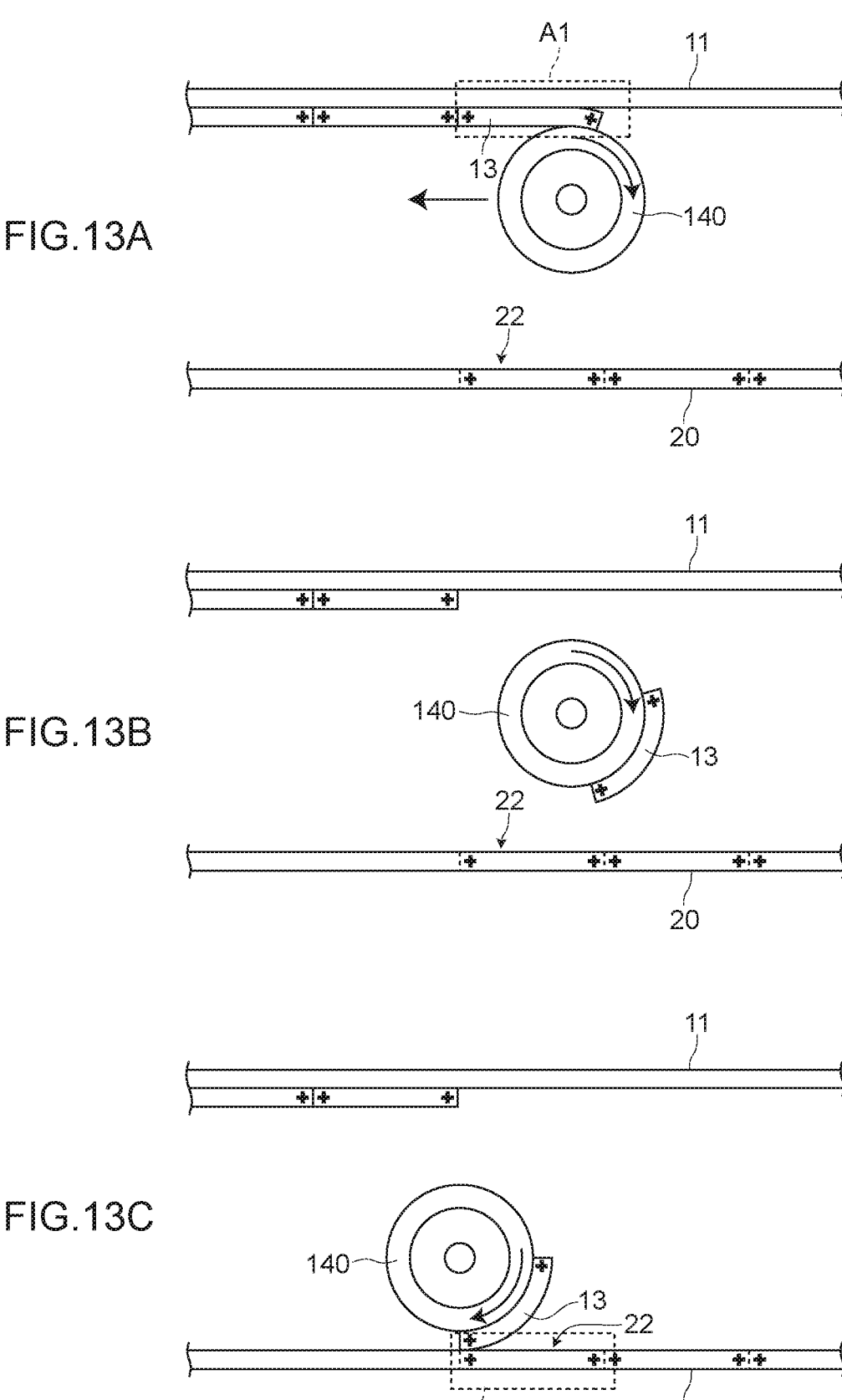
FIG. 13A to FIG. 13C are views illustrating the transfer and the sticking of a sticking film piece 13 according to an embodiment 2.
Figure 15:
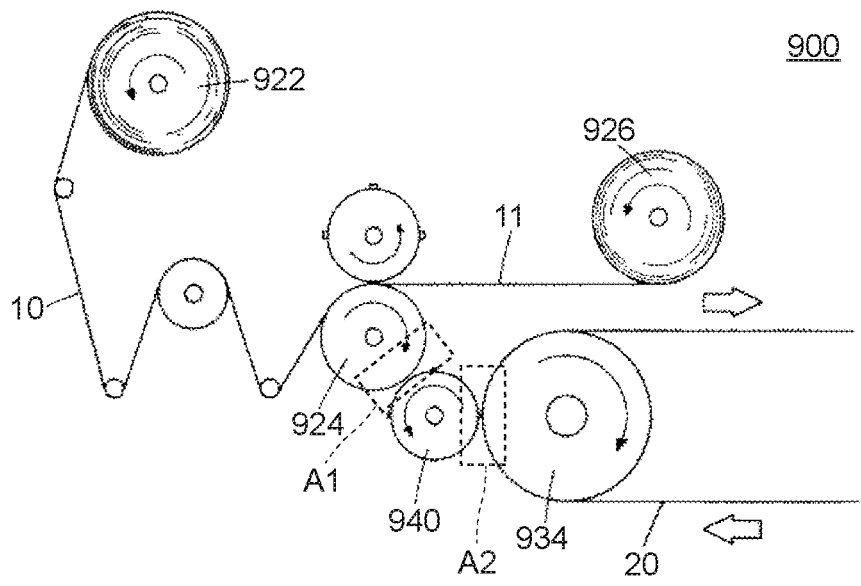
FIG. 15 is a view illustrating a conventional sticking device 900.

FIG. 13A to FIG. 13C are views illustrating a mode of the transfer and the sticking of a sticking film piece 13 according to the embodiment 2.

A sticking device 102 according to the embodiment 2 has basically substantially the same configuration as the sticking device 100 according to the embodiment 1. However, a sticking device 102 according to the embodiment 2 differs from the sticking device 100 according to the embodiment 1 with respect to a point that the sticking film piece 13 is transferred from a flat surface in place of a circumferential surface of a lamination film feed roller, and the sticking film piece is stuck to the flat surface in place of the circumferential surface of the member-to-be-stuck feed roller.

In the embodiment 2, as illustrated in FIG. 13A to FIG. 13C, a lamination film 10 and a member to be stuck 20 are disposed at positions that face each other. The lamination film 10 is linearly conveyed over a transfer roller 140 toward a right side from a left side in FIG. 13A, and the sticking film piece 13 is disposed in a predetermined transfer region A1 formed on a table, for example. Further, on a lower side of the transfer roller 140, the member to be stuck 20 is linearly conveyed toward a left side from a right side. For example, the member to be stuck 20 is disposed in a predetermined sticking region A2 formed on a table, for example.

First, as illustrated in FIG. 13A, by rolling the transfer roller 140 in the predetermined transfer region A1, the sticking film piece 13 is transferred to the circumferential surface of the transfer roller 140. The sticking film piece 13 may be transferred to the circumferential surface of the transfer roller 140 by conveying the lamination film 10.

Next, as illustrated in FIG. 13B, the position and the posture of the sticking film piece 13 on the circumferential surface of the transfer roller 140 are adjusted such that the sticking film piece 13 takes the position and the posture corresponding to the position and the posture of the member to be stuck 20 when the sticking film piece 13 is stuck to the member to be stuck 20 by moving the transfer roller 140 to the position away from both the transfer region A1 and the sticking region A2, specifically, the position away from the lamination film 10 on an upper side and the member to be stuck 20 on a lower side.

Next, the transfer roller 140 is moved downward, and as illustrated in FIG. 13C, the transfer roller 140 is rolled in the sticking region A2 so as to stick the sticking film piece 13 to the member to be stuck 20. The sticking film piece 13 may be stuck to the member to be stuck 20 by conveying the member to be stuck 20.

In the embodiment 2, both the transfer region A1 and the sticking region A2 are formed of a flat surface. However, one of the transfer region A1 and the sticking region A2 may be formed of a circumferential surface of a roller.

In this manner, the sticking device 102 according to the embodiment 2 differs from the sticking device 100 according to the embodiment 1 with respect to the point that the sticking film piece is transferred from the flat surface in place of the circumferential surface of the lamination film feed roller, and the sticking film piece is stuck to the flat surface in place of the circumferential surface of the member-to-be-stuck feed roller. However, in the same manner as the sticking device 100 according to the embodiment 1, the sticking device includes a sticking film piece adjusting unit 160 that adjusts the position and the posture of the sticking film piece 13 on the circumferential surface of the transfer roller 140 such that the sticking film piece 13 takes a position and a posture that correspond to the position and the posture of the member to be stuck 20 when the sticking film piece 13 is stuck to the member to be stuck 20 at the position away from both the transfer region A1 and the sticking region A2. With such a configuration, even when the posture of the transfer roller 140 is adjusted, the conveyance of the lamination film 10 and the conveyance of the member to be stuck 20 are not affected by such adjustment. Accordingly, the posture of the transfer roller 140 can be adjusted and hence, the sticking can be performed with high accuracy.

The sticking device 102 according to the embodiment 2 has substantially the same configuration as the sticking device 100 according to the embodiment 1 except for the point that the sticking film piece is transferred from the flat surface in place of the circumferential surface of the lamination film feed roller, and the sticking film piece is stuck to the flat surface in place of the circumferential surface of the member-to-be-stuck feed roller. Accordingly, the sticking device 102 according to the embodiment 2 can acquire the advantageous effects corresponding to the advantageous effects amongst all advantageous effects of the embodiment 1.

The present invention has been described with reference to the above-mentioned embodiments heretofore. However, the present invention is not limited to the above-mentioned embodiments. The present invention can be carried out in various modes without departing from the gist of the present invention. For example, the following modifications are also conceivable.

(1) The number, materials, shapes, positions, sizes and the like of the constituent elements described in the above-mentioned respective embodiments are provided for an exemplifying purpose, and these can be changed without impairing the advantageous effects of the present invention.

Figures 14A, 14B, 14C:
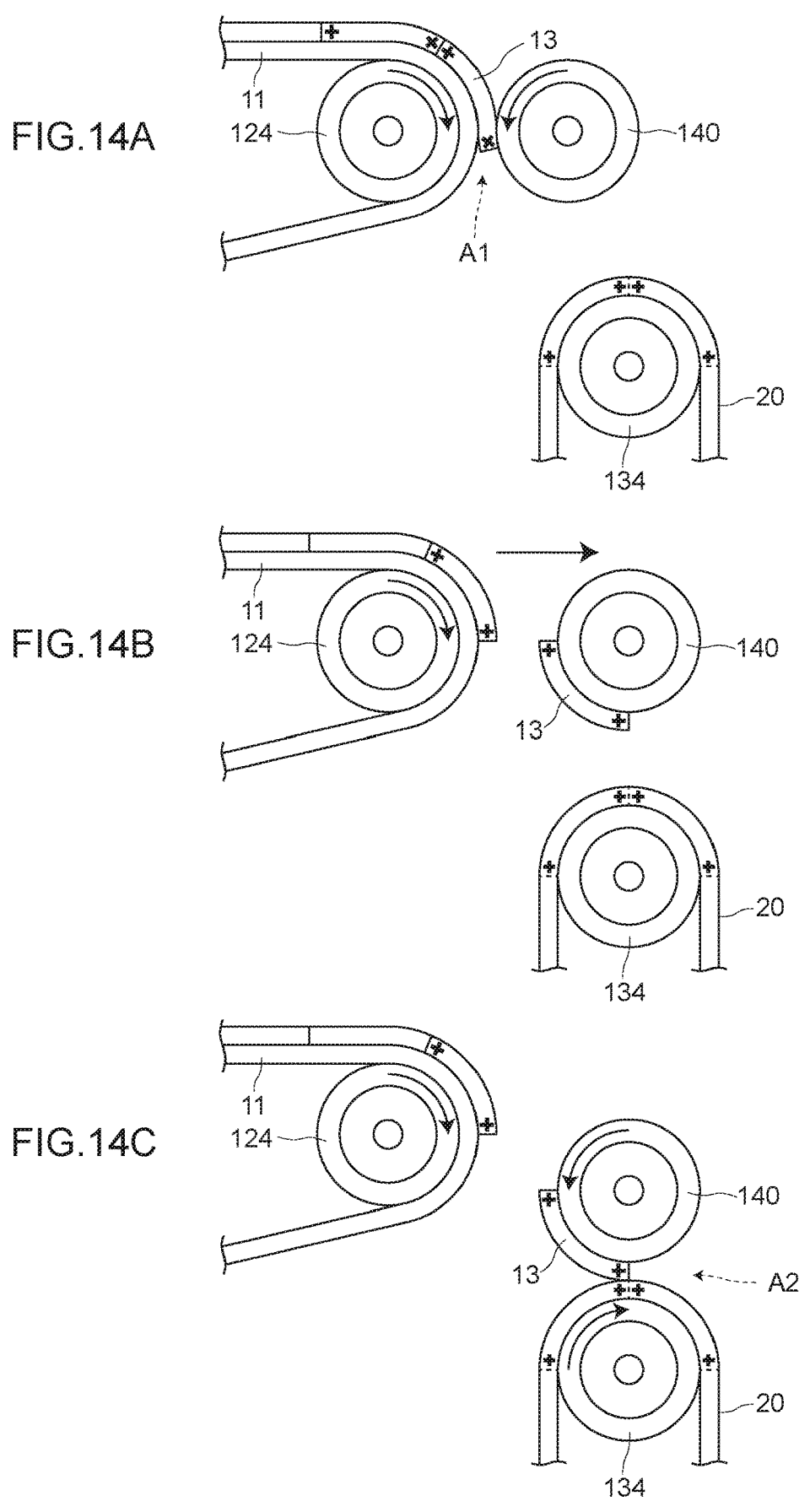

(2) In the above-mentioned embodiment 1, the lamination film feed roller 124, the transfer roller 140 and the member-to-be-stuck feed roller 134 are arranged side by side. However, the present invention is not limited to such arrangement. Provided that the transfer roller 140 can move to the position at which the transfer roller 140 is brought into contact with neither the lamination film feed roller 124 nor the member-to-be-stuck feed roller 134, it is safe to say that the arrangement of the respective rollers is the appropriate arrangement. For example, as illustrated in FIG. 14A to FIG. 14C, the lamination film feed roller 124 may be disposed on a left side, and the member-to-be-stuck feed roller 134 may be disposed on a lower side. In this case, the transfer roller 140 may be linearly moved between the lamination film feed roller and the member-to-be-stuck feed roller, or as illustrated in FIG. 13B, the transfer roller 140 may be temporarily moved to a right side and, thereafter, may be moved in a roundabout manner such as moving downward. The above-mentioned arrangements are also applicable to a table or the like. Even in a case where the transfer region A1 and the sticking region A2 are arranged obliquely or orthogonally, provided that the transfer roller 140 can be moved to be placed at positions where the transfer roller 140 is brought into contact with neither the transfer region A1 nor the sticking region A2, it is safe to say that the arrangement of the transfer region A1 and the sticking region A2 is the appropriate arrangement.

(3) In the above-mentioned respective embodiments, the first camera 170 and the second camera 180 are provided. However, the present invention is not limited to such a configuration. A material-use camera that detects the position and the posture of the lamination film (sticking film piece) may be further disposed in the vicinity of the lamination film feed roller 124. In a case where the position and the posture can be detected by any one of the first camera, the second camera and the material-use camera, it is possible to suppress the positional displacement during the transfer and the sticking within an allowable range. Accordingly, among these three cameras, it is sufficient to provide two cameras or one camera.

(4) In the above-mentioned respective embodiments, the position and the posture of the transfer roller 140 are adjusted after the transfer and before the sticking. However, the present invention is not limited to such a configuration. For example, the position and the posture of the transfer roller 140 can be adjusted before the transfer. Alternatively, the position and the posture of the transfer roller 140 can be adjusted both before the transfer and after the transfer.

(5) In the above-mentioned respective embodiments, a cover lay film is used as the sticking film. However, the present invention is not limited to such configuration. As the sticking film, a mask film or other suitable films may be used. The mask film is a film that covers a region to which plating is not applied at the time of applying plating to a printed circuit board.

(6) In the above-mentioned respective embodiments, as the sticking film, a film that has a thermoplastic adhesive material layer is formed on one surface of a cover lay film body is used. However, the present invention is not limited to such configuration. As the sticking film, a film that has an adhesive material layer other than a thermoplastic adhesive layer may be used. Further, as the sticking film, a film where the film itself is made of an adhesive material may be used. Further, a film having an adhesive layer made of an adhesive material may be used. When the film having an adhesive material layer other than a thermoplastic adhesive material layer is used, it is preferable to suitably adjust an adhesive strength between the release film and the lamination film, an adhesive strength between the transfer roller and the sticking film, and an adhesive strength between the sticking film and the member to be stuck.

(7) In the above-mentioned respective embodiments, as the transfer roller, the adhesive roller is used. However, the present invention is not limited to such configuration. As the transfer roller, a suction roller that sucks the sticking film piece through suction holes formed in a surface of the suction roller may be used. As the transfer roller, an electrostatic roller that performs peeling, transfer, and sticking using an electrostatic force obtained by charging the roller may be used. A combination of an adhesive roller and these rollers may be also used.

(8) In the above-mentioned respective embodiments, both the lamination film and the member to be stuck are conveyed by roll-to-roll processing. However, the present invention is not limited to such configuration. A conveyance mechanism other than roll-to-roll processing may be used.

(9) In the above-mentioned embodiment 1, the lamination film conveyance adjusting mechanism 120 conveys the lamination film from a lower side toward an upper side, and the member-to-be-stuck conveyance adjusting mechanism 130 conveys the member to be stuck 20 from the upper side toward the lower side. However, the present invention is not limited to such configuration. The lamination film conveyance adjusting mechanism 120 may convey the lamination film from an upper side toward a lower side, and the member-to-be-stuck conveyance adjusting mechanism 130 may convey the member to be stuck 20 from the lower side toward the upper side. In this case, the transfer roller 140 can be rotated in the same direction both at the time of performing the transfer and at the time of performing sticking. Further, the lamination film 10 may be conveyed from an upper side toward a lower side, and the member to be stuck 20 may be also conveyed from an upper side toward a lower side. The lamination film may be conveyed from a lower side toward an upper side and the member to be stuck may be conveyed from a lower side toward an upper side. In this case, the rotation direction of the transfer roller 140 is reversed between at the time of performing the transfer and at the time of performing sticking and hence, the lamination film is stuck to the member to be stuck from a rear end side at the time of performing the transfer.

(10) In the above-mentioned respective embodiments, the moving unit is the unit that moves the transfer roller. However, the present invention is not limited to such configuration. The moving unit may be a unit that moves the lamination film feed roller 124, a unit that moves the lamination film conveyance adjusting mechanism 120, a unit that moves the member-to-be-stuck feed roller 134 or a unit that moves the member-to-be-stuck conveyance adjusting mechanism 130.

What is claimed is:

1. A sticking device where a sticking film piece is transferred to a circumferential surface of a transfer roller in a predetermined transfer region, and the sticking film piece is stuck to a member to be stuck by the transfer roller in a predetermined sticking region, the sticking device comprising:

the transfer roller that transfers the sticking film piece to the circumferential surface of the transfer roller in the transfer region and sticks the sticking film piece to the member to be stuck in the sticking region;

a moving unit that relatively moves the transfer roller to the transfer region when the sticking film piece is transferred to the circumferential surface of the transfer roller, relatively moves the transfer roller to a position away from both the transfer region and the sticking region in a stage at least either before or after the sticking film piece is transferred to the circumferential surface of the transfer roller, and relatively moves the transfer roller to the sticking region when the sticking film piece is stuck to the member to be stuck; and a sticking film piece adjusting unit that adjusts a position and a posture of the sticking film piece on the circumferential surface of the transfer roller such that the sticking film piece takes a position that corresponds to the position and the posture of the member to be stuck when the sticking film piece is stuck to the member to be stuck at the position away from both the transfer region and the sticking region, wherein the sticking film piece adjusting unit includes:

a rotation angle adjusting unit that adjusts a sticking start position of the sticking film piece on the circumferential surface of the transfer roller;

a width direction adjusting unit that adjusts a position of the sticking film piece in a width direction that corresponds to a position of the member to be stuck in a width direction; and an inclination adjusting unit that adjusts an angle of the transfer roller with respect to a sticking angle of the member to be stuck, wherein the sticking device further comprises:

a lamination film feed roller that feeds a lamination film formed by stacking the sticking film piece and a release film; and a member-to-be-stuck feed roller that feeds a member to be stuck, wherein the transfer region is formed on a circumferential surface of the lamination film feed roller, the sticking region is formed on a circumferential surface of the member-to-be-stuck feed roller, and the transfer roller transfers the sticking film piece onto the circumferential surface of the lamination film feed roller in transferring the sticking film piece to the circumferential surface of the transfer roller, and the transfer roller sticks the sticking film piece to the member to be stuck on the member-to-be-stuck feed roller in sticking the sticking film piece to the member to be stuck.

2. A sticking device where a sticking film piece is transferred to a circumferential surface of a transfer roller in a predetermined transfer region, and the sticking film piece is stuck to a member to be stuck by the transfer roller in a predetermined sticking region, the sticking device comprising:

the transfer roller that transfers the sticking film piece to the circumferential surface of the transfer roller in the transfer region and sticks the sticking film piece to the member to be stuck in the sticking region;

a moving unit that relatively moves the transfer roller to the transfer region when the sticking film piece is transferred to the circumferential surface of the transfer roller, relatively moves the transfer roller to a position away from both the transfer region and the sticking region in a stage at least either before or after the sticking film piece is transferred to the circumferential surface of the transfer roller, and relatively moves the transfer roller to the sticking region when the sticking film piece is stuck to the member to be stuck; and a sticking film piece adjusting unit that adjusts a position and a posture of the sticking film piece on the circumferential surface of the transfer roller such that the sticking film piece takes a position that corresponds to the position and the posture of the member to be stuck when the sticking film piece is stuck to the member to be stuck at the position away from both the transfer region and the sticking region, wherein the sticking film piece adjusting unit includes:

a rotation angle adjusting unit that adjusts a sticking start position of the sticking film piece on the circumferential surface of the transfer roller;

a width direction adjusting unit that adjusts a position of the sticking film piece in a width direction that corresponds to a position of the member to be stuck in a width direction; and an inclination adjusting unit that adjusts an angle of the transfer roller with respect to a sticking angle of the member to be stuck, wherein the sticking device further comprises a first camera that detects a position and a posture of the sticking film piece that is transferred to the transfer roller, and the sticking film piece adjusting unit adjusts, based on a detection result of the first camera, the sticking start position of the sticking film piece, the width direction of the sticking film piece, and the angle of the transfer roller with respect to the sticking angle of the member to be stuck.

3. The sticking device according to claim 2, further comprising:

a second camera that detects a position and a posture of the member to be stuck, and a position and a posture of the sticking film piece that is stuck to the member to be stuck, and the sticking film piece adjusting unit adjusts, based on a detection result of the second camera, the sticking start position of the sticking film piece, the width direction of the sticking film piece, and an angle of the transfer roller with respect to the sticking angle of the member to be stuck.

4. The sticking device according to claim 2, further comprising:

a second camera that detects a position and a posture of the member to be stuck, and a position and a posture of the sticking film piece that is stuck to the member to be stuck, and the sticking film piece adjusting unit adjusts, based on a detection result of the second camera, the sticking start position of the sticking film piece, the width direction of the sticking film piece, and the angle of the transfer roller with respect to the sticking angle of the member to be stuck, and a conveyance position of the member to be stuck.

5. The sticking device according to claim 1, wherein the moving unit is a unit that moves the transfer roller.

6. The sticking device according to claim 1, wherein the lamination film feed roller, the transfer roller, and the member-to-be-stuck feed roller are arranged side by side along a direction orthogonal to an axis of the lamination film feed roller, the transfer roller is disposed between the lamination film feed roller and the member-to-be-stuck feed roller.

7. The sticking device according to claim 1, wherein the transfer roller is capable of rotating in a normal direction and in a reverse direction.

8. The sticking device according to claim 2, wherein the moving unit is a unit that moves the transfer roller.

9. The sticking device according to claim 2, wherein the transfer roller is capable of rotating in a normal direction and in a reverse direction.

* * * * *